United States Patent Office 3,510,342
Patented May 5, 1970

3,510,342
ADHESIVE-REPELLING SURFACE COATINGS
Hans-Werner Demmig and Kurt Rehnelt, Dusseldorf-Holthausen, Germany, assignors to Henkel & Cie G.m.b.H., Dusseldorf-Holthausen, Germany, a corporation of Germany
No Drawing. Filed Nov. 22, 1966, Ser. No. 596,099
Claims priority, application Germany, Dec. 2, 1965,
H 57,847
Int. Cl. C09j 7/04
U.S. Cl. 117—68.5          5 Claims

ABSTRACT OF THE DISCLOSURE

The present invention relates to surface coatings of low adhesion with respect to pressure-sensitive adhesives containing polyethylene imines acylated with higher fatty acids, to be used on cellulose-containing materials.

CLAIM FOR PRIORITY

Under the provisions of 35 U.S.C. 119 the right of priority of the corresponding German patent application H 57,847, filed Dec. 2, 1965, is hereby claimed.

THE PRIOR ART

Surface coatings of low adhesion with respect to pressure-sensitive adhesives, to be used on cellulose-containing materials are required particularly for the production of adhesive tapes intended for coating the reverse side with pressure-sensitive adhesives. These coatings should be effective in relatively small amounts, but they should not diffuse and they should be capable of being bonded on the basic material.

It is known in the art to produce adhesion-preventing surface coatings for self-adhesive tapes and the like. These coatings are based on polymerizates of vinyl esters of higher molecular weight fatty acids, the fatty acid radical of which contains not less than 16 carbon atoms. However, these anti-adhesive coatings show a relatively limited affinity to the cellulose and, consequently, they are apt to separate from the bonding material and to diffuse into the adhesive itself when the self-adhesive tapes were rolled. Therefore, to eliminate these disadvantages, it was necessary to use organic polyisocyanates concomitantly. However, as it is well known, the utilization of organic polyisocyanates exhibits a considerable disadvantage in regard to the processing due to their moisture sensitivity and possible toxic properties.

OBJECTS OF THE INVENTION

An object of the invention is to avoid the indicated disadvantages and to obtain an anti-adhesive coating, which is rigidly bonded on the basic substance, and which can be applied onto cellulose-containing materials without any particular precautionary measures.

A further object of the invention is the development of an adhesive repelling coating for cellulose-containing materials comprising a bonding agent and a polyethylene imine acylated with an aliphatic monocarboxylic acid having from 6 to 30 carbon atoms.

Another object of the invention is the development of a cellulose-containing film coated on one side thereof with a firmly bonded layer of a polyethylene imine acylated with an aliphatic monocarboxylic acid having from 6 to 30 carbon atoms.

A still further object of the invention is, in pressure-sensitive adhesive materials comprising a cellulose-containing material coated on one side with a pressure-sensitive adhesive and on the other side with an adhesive repellent coating, the improvement which comprises utilizing a coating containing a layer of a polyethylene imine acylated with an aliphatic monocarboxylic acid having from 6 to 30 carbon atoms, as said adhesive repellent coating.

These and other objects of the present invention will become more apparent as the description thereof proceeds.

DESCRIPTION OF THE INVENTION

The object of obtaining an adhesive repelling coating for cellulose-containing materials was fulfilled by means of a surface coating containing polyethylene imines acylated with aliphatic monocarboxylic acids having 6 to 30 carbon atoms.

The preparation of the acrylated polyethylene imines can be carried out by the methods known for the preparation of acid amides by reacting the amine with an aliphatic monocarboxylic acid or with a derivative thereof. For example, the polyethylene imine can be heated with the free carboxylic acids, advantageously in the presence of an inert organic solvent, until acid-amide groups have formed on splitting off of water. Instead of the free carboxylic acids, their esters with low molecular weight monohydric alcohols or their halides, in particular chlorides, can be reacted with the polyethylene imines. According to an advantageous embodiment, the acylation is carried out only to such an extent that the acylated polyethylene imine contains up to about 80%, preferably 20 to 50% of non-acylated imine groups.

The polyethylene imines to be acylated are commercially available products prepared by polymerization of ethylene imine to various molecular weights. The polymerization, however, is stopped while the polymer is still soluble in water, and the polyethylene imines differ in their molecular weight or their viscosity in aqueous solution and are so characterized.

The aliphatic monocarboxylic acids employed for the acylation step should contain about 6 to 30, particularly 12 to 24 carbon atoms. It is preferable to utilize the naturally-occurring fatty acids, particularly saturated acids. The optimum results are obtained with aliphatic alkanoic acids having from 12 to 24 carbon atoms. Besides the monocarboxylic acids, multi-functional carboxylic acids in small amounts of up to about 5% can also be used in the formation of the acid amides. For example, adipic acid, sebacic acid, citric acid, terephthalic acid and still other acids can be considered for this purpose. The ratio of polyethylene imine to aliphatic monocarboxylic acid or to a derivative of same should be chosen so that about 0.2 to 1 mol of carboxylic acid be employed for each mol of imino groups.

The reaction of the polyethylene imine with the aliphatic carboxylic acids or their derivatives can be conducted by heating with or without solvents. It is preferable, however, to employ water-immiscible organic solvents and conduct the reaction with azeotropic distillation. Furthermore, it has been found advantageous to carry out the formation of the polyethylene imine acylates under exclusion of oxygen, for example in an atmosphere of nitrogen or inert gas. By this method products of particularly light coloring are obtained.

It is not necessary that the polyethylene imine has to react entirely with the carboxylic acid present. On the contrary, the reaction can be interrupted after a partial acylation, as measured by the water separated during the reaction. The reaction mixture will thus still contain carboxylic acid, the carboxylic acid being present in the mixture in the form of an acid salt of the polyethylene imine. Such mixtures themselves can be used directly for the preparation of the surface coatings of the invention. Moreover, those partially acylated polyethylene imines are usable, wherein the still free imino groups are neutralized with inorganic acids.

The solutions of the acylated polyethylene imines in the reaction solvent medium can be used directly for the preparation of the surface coatings. However, they can also be dispersed in water or the reaction solvent medium can be removed and the acylated polyethylene imine can itself be dispersed in water and can be used as a dispersion. Also mixtures of various acylated polyethylene imines can be employed, and it is possible to carry out the coating directly from the melted mass.

The acylated polyethylene imines in solution or dispersion can be applied to the cellulose-containing material by rolling on, brushing on, painting on or by similar methods. Thereafter, the solvent or water is evaporated. The amount of the coating used is adjusted so that about 5 to 50 g./m.$^2$, in particular 8 to 15 g./m.$^2$ of the acylated polyethylene imine are applied to the cellulose-containing material.

In some cases the acylated polyethylene imines display an adhesive repellent effect of such intensity, that they cannot be used alone, but only together with other film forming substances of either little or no adhesive repelling nature. According to an advantageous form of process, the acylated polyethylene imines are used for the preparation of the surface coatings of the invention together with film forming aminoplasts, in particular partially etherized melamine-formaldehyde or urea-formaldehyde resins or mixtures of these resins. In the place of the melamine or urea resins, alkyd resins can also be utilized. In these cases, the proportion of the acylated polyethylene imines may fluctuate within widest limits. Preferably, the content of the acylated polyethylene imines in the coating should be between about 10 to 90%, preferably between 20 to 70%, based on the total solids content of the coating.

When utilizing a mixture of the acylated polyethylene imines and a film-forming ingredient, it is desirable to mix a dispersion or solution of the acylated polyethylene imine with a solution or dispersion of the film-forming ingredient. In these cases too, the coating of the cellulose-containing material can be carried out in well known manner by rolling on, brushing on, spraying on or any other known method. If so desired, the solvent or the water can be evaporated thereafter, for example by heating to temperatures of about 80–150° C. Thereby film formation occurs, and possibly a continued condensation or hardening of the synthetic resins used as previously mentioned. The application of solid substances should amount preferably to between 8 to 15 g./m.$^2$. For the preparation methods described, in particular paper is preferred as the cellulose-containing material.

The surface coatings of the invention are distinguished by their glossy appearance, and, in contrast to silicone films, they can be inscribed, for example, with a ball point pen. The coated papers obtained by means of the coating usually have a higher resistance against tearing. On the base of the strong adhesion of the coatings, in particular on paper, no diffusion into the pressure-sensitive adhesive occurs when the coated paper is rolled.

The adhesive repellent surface coatings according to the invention can be utilized particularly for coating of the reverse sides of pressure-sensitive adhesive tapes on the base of cellulose containing binders such as paper.

The following examples are illustrative of the process of preparing the acylated polyethylene imines and the coating of papers. It is to be understood, however, that these expedients are not to be deemed limitative in any manner.

PREPARATION OF THE ACYLATED POLYETHYLENE IMINES

Example 1

100 gm. of a 50% aqueous solution (14,300 cp. at 20° C.) of a commercially available polyethylene imine (corresponding to 1.15 mols) was admixed with 500 cc. of xylene in a reaction vessel equipped with a water separator and a gas-inlet tube. The mixture was heated to boiling point in the reflux condenser under normal pressure until no more water passed over. Thereafter a monocarboxylic acid, as per Table I, was added to this solution and the heating at the boiling point was continued for some time under an atmosphere of nitrogen, while more water was separated. The solution obtained was used as such for the preparation of adhesive repellent coatings. Table I shows the preparation conditions. "Separated water" indicates the amount of water (in cc.) which was separated after the addition of the monocarboxylic acid. The content of the solution given in the last column refers to the total solids content of the solution in percent by weight.

TABLE I

| No. | Acid | Mols | Separated water (ccm) | Reaction time (hrs) | Solids Content of solution in percent by weight |
|---|---|---|---|---|---|
| A | 134 g. of palmitic acid | 0.525 | 10.1 | 2½ | 28.4 |
| B | 256 gm. of palmitic acid | 1.0 | 11.8 | 3 | 40.6 |
| C | 330 gm. of stearic acid | 1.15 | 13.1 | 3½ | 46.1 |
| D | 392 gm. of behenic acid | 1.15 | 13.0 | 3 | 50.5 |
| E | 262 gm. of myristic acid | 1.15 | 12.3 | 2½ | 41.2 |

Example II 239 gm. of about an 18% aqueous solution of polyethylene imine (about 0.5 mol, 200 cp. at 20° C.) were admixed with 500 cm. of xylene in a round flask equipped with water separator and gas-inlet tube. The solution was heated to boiling point and refluxed. After no more water passed over, 142 gm. of stearic acid (0.5 mol) were added to the xylene solution, which was then maintained under boiling and refluxing for 2 hours. During this period of time 8.9 cc. of water were separated. About a 29% solution of the acylated polyethylene imine in xylene was obtained.

Example III 160 gm. of a 50% aqueous polyethylene imine solution (14,300 cp. at 20° C.) together with 430 gm. of xylene were heated to reflux in a reaction vessel, equipped with a water separator and a gas-inlet tube, until no more water was separated. After the obtained mixture had been subjected to cooling with ice water, 120 gm. of palmitic acid chloride were added dropwise. After a further addition of 100 cc. of xylene, the mixture was heated to reflux for 2 hours. The obtained solution of polyethylene imine acylated with palmitic acid occurred in the form of its hydrochloride salt and contained 0.24 mol of palmitic acid to each 1 mol of ethylene imine. The solution could be used without further purification for the preparation of anti-adhesive coatings.

PREPARATION OF THE SURFACE COATINGS

Example IV

A mixture was prepared containing the following ingredients:

|  | Gm. |
|---|---|
| 60% solution of an oil-modified alkyd resin in toluene | 50 |
| Acylated polyethylene imine solution (prepared as in Example IA) | 120 |
| Xylene | 100 |
| Calciumnaphthenate | 0.6 |

85 g./m.$^2$ heavy kraft papers were coated with this mixture. The mixture was applied by rolling onto the paper, which was then dried for 15 minutes at a temperature of 110° C.

The reverse sides of these papers were coated, in the usual manner, with a contact or pressure-sensitive adhesive consisting of 20 parts by weight of natural rubber, 5 parts by weight of zinc oxide, 15 parts by weight each of polyterpene resin and of rosin, 5 parts by weight of an oil-soluble phenol-formaldehyde resin, and the usual stabilizing agents. To test the adhesion of the pressure-sensitive adhesive on the anti-adhesive coated paper, adhesive tapes 40 cm. long and 5 cm. wide coated with the above pressure-sensitive adhesive were manually pressed onto the anti-adhesive coated side of the paper strips, coated as previously described, and the force which was needed to remove the adhesive tape during 1 minute at an angle of 170° was measured. The comparative value for this force is referred to as the adhesive force of the anti-adhesive coating. This force amounted to 1,200 p. (pond) for the separation from the alkyd resin-coated paper without any additions. As reference unit it was equal to 100. Untreated paper corresponded to a value of 91.7% (1,100 p.). Due to the coating according to the invention, the adhesive force was decreased to 42%, based on a coating of pure alkyd resin.

Example V 35 gm. of the solution obtained as described in Example IB were dispersed in 35 gm. of water under stirring and then admixed with 25 gm. of an alcohol-soluble melamine-formaldehyde resin partially etherized with butanol, "Superbeckamin 850." The solution obtained was applied by means of rolling on to a 85 g./m.$^2$ heavy paper, so that, after drying at 120° C. for 15 minutes, a coating of 9.0 g./m.$^2$ was obtained.

For purpose of comparison, the same kind of paper was coated with the same weight amount (9.0 g./m.$^2$) of melamine-formaldehyde resin, however, without the addition of the solution obtained according to Example IB.

The coated papers were examined as described in Example IV utilizing the same pressure-sensitive adhesive coated paper. It was found, that the film containing the polyethylene imine acylated with palmitic acid exhibited only 6.3% of the adhesive force compared with the paper coated with melamine resin alone, which required 630 p. of drawing-off force.

Example VI 32.4 gm. of the solution described in Example IC of the acylated polyethylene imine were dispersed in 32 gm. of water under brisk stirring and admixed with 25 gm. of a commercial melamine-formaldehyde resin partially etherized with butanol, "Superbeckamin 850." Then 85 g./m.$^2$ heavy papers were coated by brushing on the dispersion. After drying the papers at 110° C. for 15 minutes a solid content of application of 9.5 g./m.$^2$ remained.

The examination of the films was carried out as described in Example IV. It was found that only 11% of the adhesive force was required for drawing off, based on a comparable coating with melamine-formaldehyde resin (630 p.). In reference to untreated paper, only 6.4% of the adhesive force was needed.

Example VII 30 gm. of the solution prepared according to Example ID were admixed with 35 gm. of water and 50 gm. of toluene under vigorous stirring. After an addition of 25 gm. of a melamine-formaldehyde resin partially etherized with butanol "Superbeckamin 850," the dispersion was used for the coating of paper having a weight of 85 g./m.$^2$. The drying took place at 115° C. for 15 minutes. A coating of 9.0 g./m.$^2$ was obtained.

The measuring of the relative draw-off force was effected as described in Example IV and showed 11% of the original adhesive force, based on a paper coated with the partially etherized melamine-formaldehyde resin alone.

However, when a solution was used for coating, which contained equal parts by weight of the acylated polyethylene imine of Example ID and alkyd resin (as per Example IV) 34% of the relative adhesive force could still be observed. When the amount of the acylated polyethylene imine of Example ID was reduced to 33%, 64.0% of the original adhesive force was noted.

Example VIII

Varying amounts of the solution obtained according to Example IE were admixed with the identical amount of water and rigorously stirred with toluene. Various amounts of a commercial melamine-formaldehyde resin partially etherized with butanol, "Superbeckamin 850," were added to the dispersion thus obtained, so that about 25% dispersion were obtained containing as total solids, 0, 20, 40, 60, 80 or 90% of the acylated polyethylene imine of Example IE. These dispersions were applied onto a sodium kraft paper weighing 85 g./m.$^2$. A coating of 9 to 10 g./m.$^2$ of solid substance was obtained on the paper.

The following Table II represents the relative adhesive force based on a coating with butylated melamine formaldehyde resin only.

Content of acylated polyethylene imine in percent of total solids:

TABLE II

| | Relative adhesive force strength, percent |
|---|---|
| 0.0 | 100 |
| 20.0 | 27 |
| 40.0 | 15.9 |
| 60.0 | 8.0 |
| 80.0 | 11.1 |
| 90.0 | 11.1 |

Example IX 35 gm. of the solution obtained according to Example II were admixed with 35 gm. of water and 50 g. of toluene under brisk stirring, and then 25 gm. of a melamine-formaldehyde resin partially etherized with butanol, "Superbeckamin 850," were added thereto. The obtained dispersion was used for coating papers having a weight of 85 g./m.$^2$ and dried for 15 minutes at a temperature of 110° C. on the papers. The coating amounted to 10 g./m.$^2$.

The testing for the comparison of relative adhesive forces was conducted as described in Example IV. Based on a butylated melamine resin coating, only 24% of the draw-off adhesive force was required.

Example X 25 gm. of a solution of partially butylated 60% melamine-formaldehyde resin, "Superbackamin 850," was diluted with 30 gm. of water and admixed with 47 gm. of the solution of the acylated polyethylene imine prepared according to Example III. Papers with a weight of 85 g./m.$^2$ were coated with the solution thus obtained and dried for 15 minutes at 110° C. Amount of application, 12 g./m.$^2$.

The testing of the relative adhesive force was effected as described in Example IV. Based on a butylated melamine-resin coating, 38% of the draw-off adhesive force, and based on untreated papers, 22% of the draw-off adhesive force were ascertained.

The preceding specific embodiments are illustrative of the invention. It is to be understood, however, that other expedients known to those skilled in the art can be employed without departing from the spirit of the invention or the scope of the appended claims.

We claim:

1. In pressure-sensitive adhesive materials comprising a cellulose containing material coated on one side with a pressure-sensitive adhesive and on the other side with an adhesive repellent coating, the improvement which comprises a coating of a polyethylene imine acylated with an aliphatic monocarboxylic acid having from 6 to 30 carbon atoms, as said adhesive repellent coating, the mol ratio of said acid to said imine being in the range of from 0.2 to 1 mol of said acid per mol of said imine.

2. Pressure-sensitive adhesive materials of claim 1 wherein said acid is naturally-occurring fatty acid having from 12 to 24 carbon atoms.

3. Pressure-sensitive adhesive materials of claim 1 wherein said polyethylene imine acylated with said acid is also acylated with up to 5% by weight of said acid, with a polycarboxylic acid.

4. Pressure-sensitive adhesive materials of claim 1 wherein said imine is partially acylated and contains up to 80% of non-acylated imine groups.

5. Pressure-sensitive adhesive materials of claim 4 wherein said partially acylated imine contains from 20% to 50% of non-acylated imine groups.

References Cited

UNITED STATES PATENTS

| | | | |
|---|---|---|---|
| 2,677,681 | 5/1954 | Gill | 117—145 |
| 2,727,836 | 12/1955 | Brillhart | 117—144 |
| 3,009,831 | 11/1961 | Wilfinger | 117—145 |
| 3,111,418 | 11/1963 | Gilbert et al. | 117—68.5 |
| 3,250,135 | 1/1966 | Hurst | 117—145 |
| 3,394,799 | 7/1968 | Ritson et al. | 117—68.5 |

MURRAY KATZ, Primary Examiner

B. D. PIANALTO, Assistant Examiner

U.S. Cl. XR.

117—122, 155, 161